United States Patent [19]
Cafri

[11] Patent Number: 4,765,260
[45] Date of Patent: Aug. 23, 1988

[54] MACHINE FOR PLANTING SEEDLINGS

[76] Inventor: Nissan Cafri, Moshav Ram On, D.N., Megido, Israel

[21] Appl. No.: 53,361

[22] Filed: May 22, 1987

[51] Int. Cl.$^4$ .............................................. A01G 11/02
[52] U.S. Cl. .............................................. 111/2; 111/91
[58] Field of Search ................................ 111/2, 3, 89–92

[56] References Cited

U.S. PATENT DOCUMENTS

| | | | |
|---|---|---|---|
| 884,139 | 4/1908 | Dyer et al. | 111/3 |
| 2,234,778 | 3/1941 | Redwood | 111/89 |
| 2,899,918 | 8/1959 | McMillan | 111/3 |
| 3,107,637 | 10/1963 | Saifuku | 111/3 |
| 3,589,319 | 6/1971 | Peters | 111/2 |
| 3,712,252 | 1/1973 | Huang | 111/2 |
| 3,894,589 | 7/1975 | Ciraud | 111/2 X |
| 4,278,035 | 7/1981 | Pickett et al. | 111/2 |
| 4,388,035 | 6/1983 | Cayton et al. | 111/2 |

FOREIGN PATENT DOCUMENTS

| | | | |
|---|---|---|---|
| 530439 | 7/1931 | Fed. Rep. of Germany | 111/90 |
| 634451 | 2/1928 | France | 111/3 |
| 637608 | 5/1928 | France | 111/2 |
| 982083 | 2/1965 | United Kingdom | 111/3 |

Primary Examiner—James R. Feyrer
Attorney, Agent, or Firm—Angelo Notaro

[57] ABSTRACT

A machine for planting seedlings and to be pulled by a tractor, comprises a chassis onto which are connected a plurality of planting units. Each unit comprises three main parts, a double pathway defined by a double endless chain which carries sleeve shaped members; hoses for the insertion of the seedlings into the soil with the aid of an air stream and a rotating member which carries pointed dibbles that become inserted through each sleeve member moving on the pathway with the endless chain into the soil and to be withdrawn therefrom. The machine is to be annexed to a tractor or other vehicle for pulling the chassis over ground to be planted.

6 Claims, 5 Drawing Sheets

MACHINE FOR PLANTING SEEDLINGS

BACKGROUND OF THE INVENTION

The present invention relates to a machine for outplanting seedlings, supplied by a nursery, into a field where they may be developed and grown until harvested and delivered to consumers, and more particularly, to a fully automatic machine which is designed to perform all of the steps of an outplanting operation.

There are known machines for these purposes but, as far as known, the known machines are complex and when fully automatic, can be employed only for certain species or under special conditions, or both.

SUMMARY OF THE INVENTION

It is the object of the present invention to provide a machine which performs all of the steps of an outplanting operation, including incidental steps, from feeding seedlings into the machine to inserting each one seedling into the soil via cavities created by the machine for that purpose.

Another object of the invention is to provide a machine which is capable of working 6-10 times faster than known machine.

A further object of the invention is to provide a machine which is capable of working in various soil conditions including wet soil.

Yet a further object of the present invention is to provide a machine which is capable of outplanting seedlings in a field covered with PVC plastic sheets.

Still another object of the present invention is to provide a machine which is capable of outplanting tissue culture plantlets.

Even still another object of the present invention is to provide a machine which has minimal contact with the ground.

According to the invention, the new machine, which is designed to be pulled by a tractor along the area into which the seedlings are to be set, comprises a chassis onto which are connected a plurality of plantings units. Each unit comprises three main parts: a double pathway serving a double endless chain which carries sleeve-shaped members; means for the insertion of the seedlings into the soil with the aid of an air stream, and a rotating member which carries pointed dibbles operable to be inserted through the sleeve-shaped member, while it is moving on the said pathway with the said endless chain, into the soil and therefore withdrawable from the sleeve-shaped member.

These and further features of the invention will become clear from the following detailed description which has reference to the annexed drawings.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
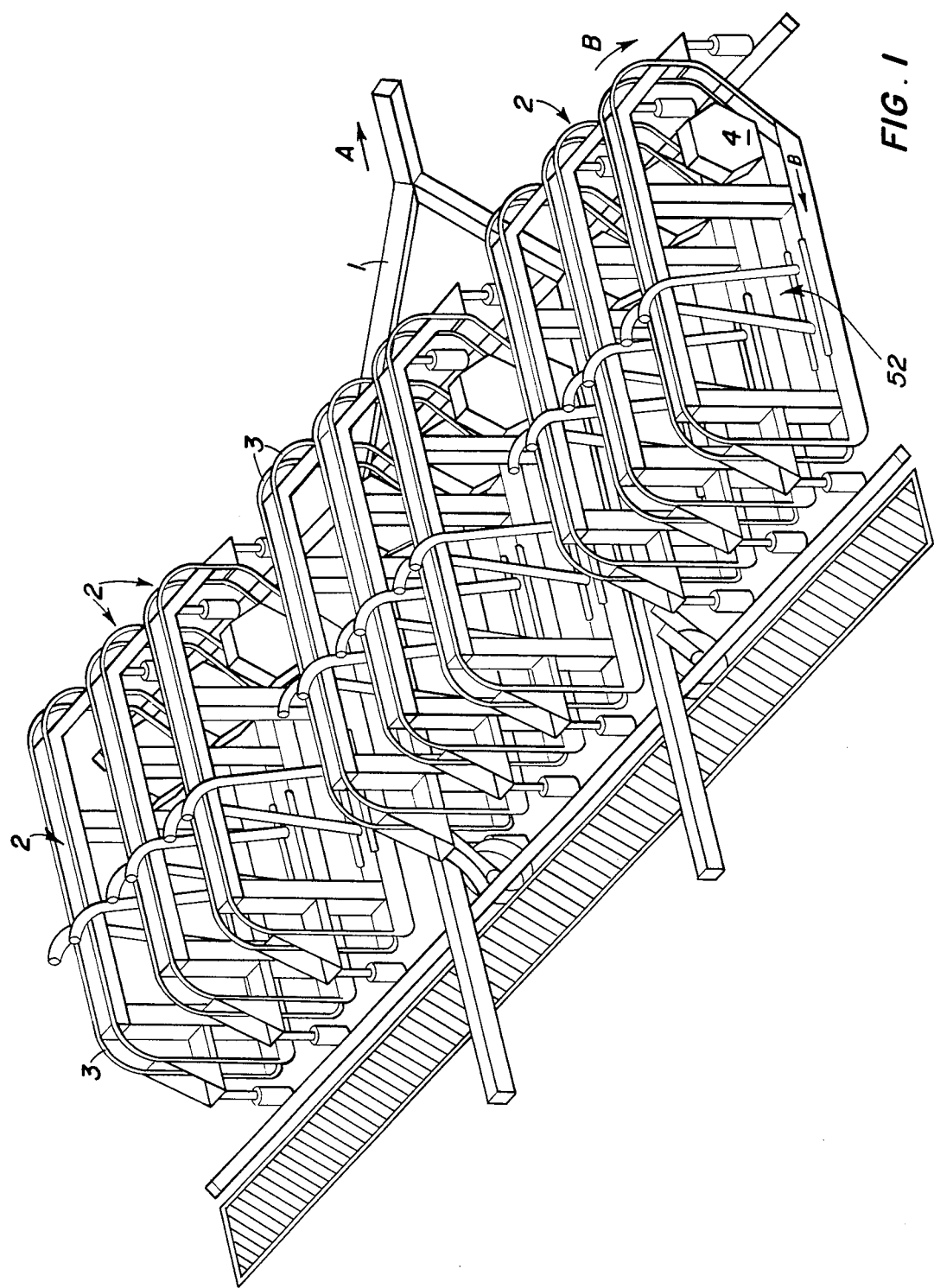
FIG. 1 is a perspective schematical view of the outplanting machine.

The new outplanting machine is pulled by a tractor in the direction of the arrow A in FIG. 1. It moves at a speed of about 4 km/h, which speed permits the preparation of the necessary depressions or cavities in the soil and the insertion thereinto of seedlings without any need for stopping the machine for performing certain operational steps.

Figure 5:
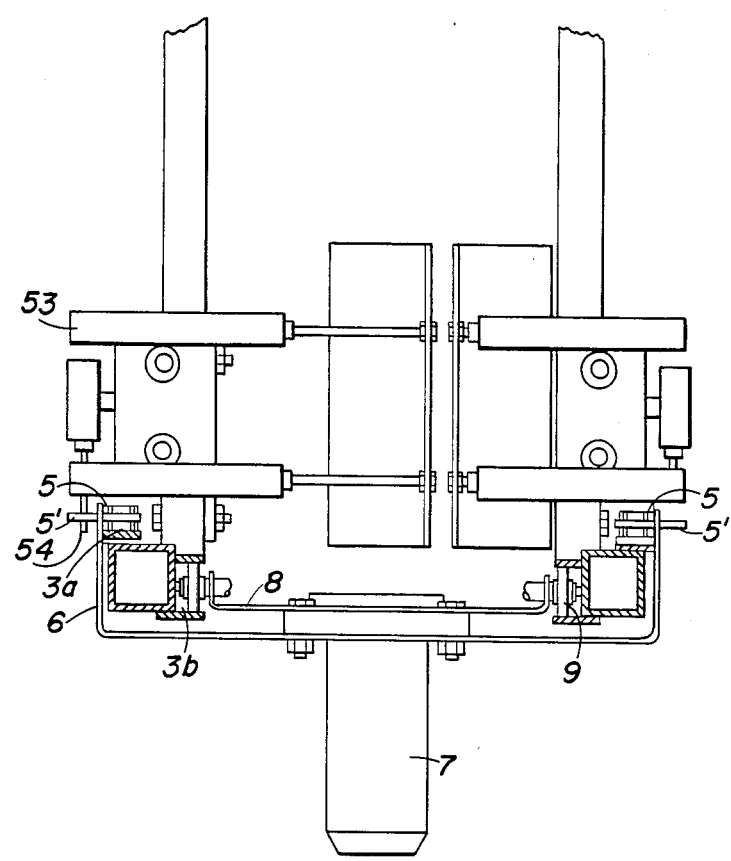
FIG. 5 is a side view of FIG. 4.

Referring now to FIG. 1, there is shown an outplanting machine, according to the invention including a chassis 1 which is connected to a plurality of outplanting units 2. Each outplanting unit comprises three main parts: a double pathway 3 which is composed of two runs 3a and 3b (FIG. 5) for two endless chains which latter carry the planting tools proper, as will become clear; a rotating hole making mechanism 4 which also drives the chains, and a plant delivery mechanism 52. As best shown in FIG. 5, the two endless chains composed of links 5 move within pathway 3a. Each link of the chain is provided with a protruding pin 5′. A support member 6 is pivotally connected to two opposite pins 5′. A cylindrical sleeve 7 within member 6 is seated in a manner which allows sleeve 7 to turn about its axis. A plate member 8 is connected to member 6. A roller 9 is connected to each side of plate member 8. Each roller 9 runs within pathway 3b. Member 6, therefore, is pivotably connected to the chain, while the roller 9 is fixed relative to the chain. Accordingly, the angle of sleeve 7, relative to the ground, can be determined by pathway 3b.

Figure 2:
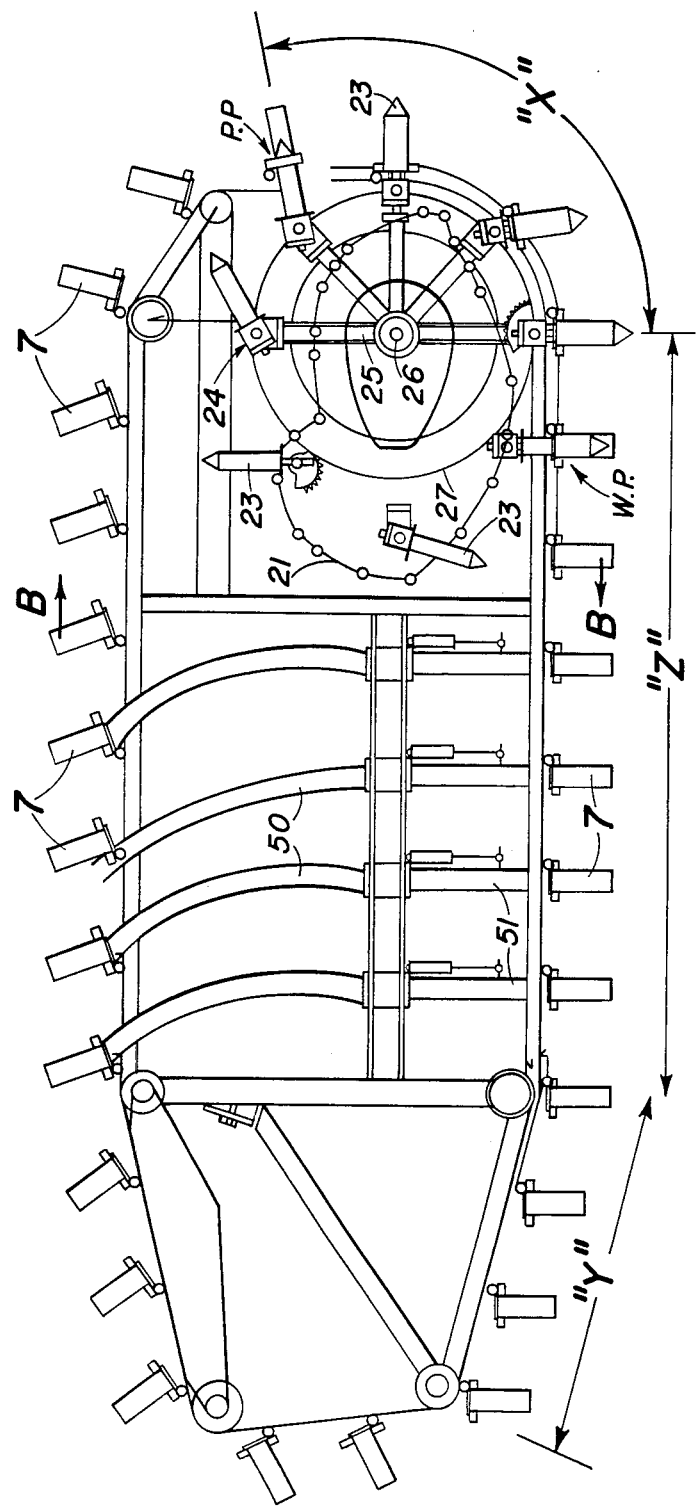
FIG. 2 is an elevational schematical side view of a planting unit.

As shown in FIG. 2, at section "X" of the machine, the chain is in contact with a gear 27 of the hole making mechanism 4. The gear 27 drives the chain. In section "Z", the chain runs parallel to the ground while in section "Y" the chain is oblique relative to section "Z".

Figure 3:
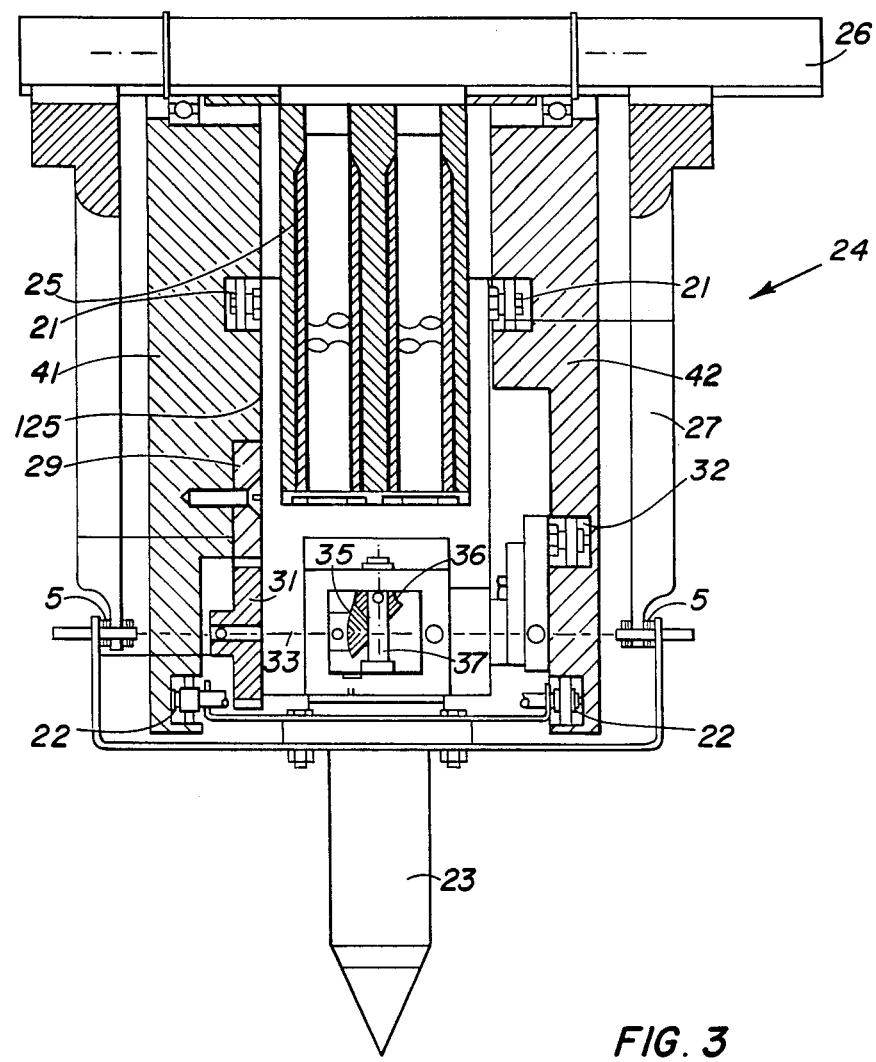
FIG. 3 illustrates the arrangement which carries the dibbles.

The hole making mechanism 4 (FIG. 3) consists of a housing which is formed of two side plates 41 and 42, which plate is provided with a first pathway 21 and a second pathway 22 which is a continuation of pathway 3b in which roller moves, plate 42 is further provided with a third pathway 32. Plate 41 is provided with toothed member 29 which is in mesh with gear 31 which is seated on axle 33 which is further provided with crown wheel 35 which in turn is in mesh with crown wheel 36 seated on axle 37 which is part of dibble 23. The whole arrangement 24 is connected via telescopic rod 25 and a sleeve 125 surrounding the axle 26 to the latter. This arrangement enables the insertion of the dibbles and sleeves into the ground with a twist like motion.

The pathway 21 guides arrangement 24 and determines its angle relative to sleeves 7, so as to enable the penetration of dibbles 23 into sleeve 7 at their meeting at approximately point "P.P." The dibble 23 is withdrawn from sleeve 7 at point "W.P."

Pathway 21 extends and shortens the telescopic rod 25, to which reference will be made.

Figure 4:
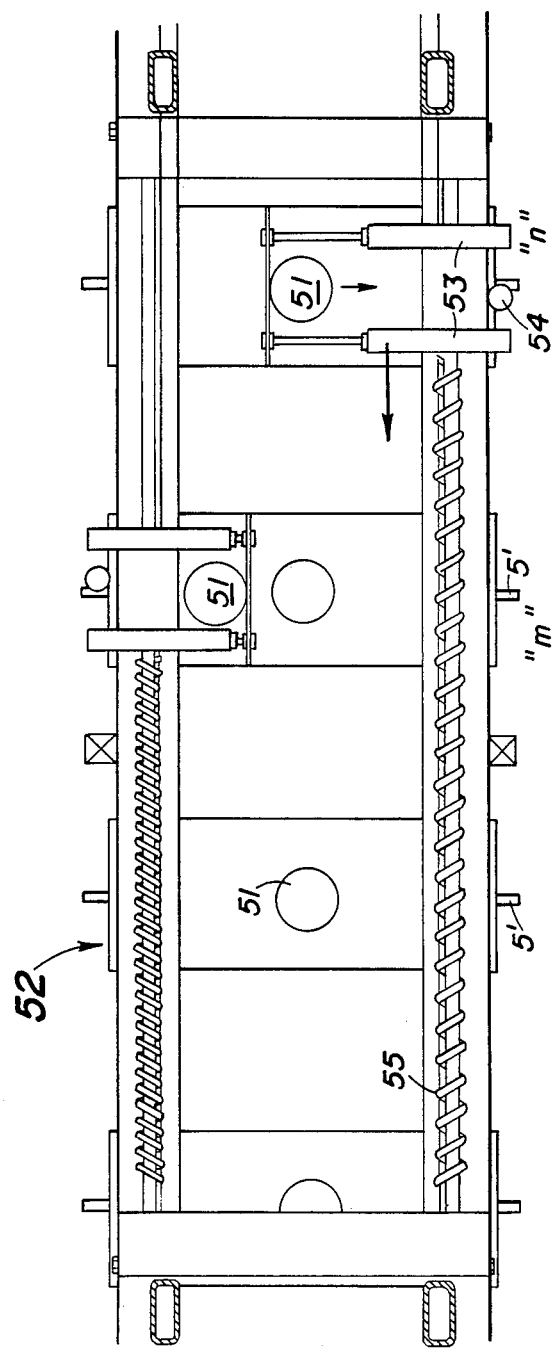
FIG. 4 shows, schematically and in a plan view, the arrangement for feeding seedlings to the machine.

The plant delivery mechanism 52 consists generally of a plurality of flexible sleeves or hoses 50 into the upper end of which the plants are inserted while its lower end is attached to a telescopic connecting member 51. The upper end of said member 51 is fixedly connected with sleeve or hose 50 while its lower end is free and is controlled and guided by means of guide arrangement 52 (FIG. 4) as follows.

Each of the members 51 are connected to a pair of hydraulic or pneumatic cylinders 53. When the pistons thereof are in the extended position, member 51 is on top of sleeve 7 enabling the insertion of a seedling. The whole arrangement travels from point "n" to "m" as pin 5' engages pin 54 while travelling, spring 55 is depressed thus when pin 54 releases pin 5' at "m", the whole arrangement returns to point "n" and so on. It must be stated that the second arrangement operates simultaneously to the first of the two, namely, when one is at point "n" the other is at point "m".

The tractor to which the machine is attached travels in the direction of arrow "A", the endless chain moves between the double pathways 3. The chain moves in direction "B". The speed at which the chain travels is synchronized with the speed of the tractor thus section "Z" is stationary relative to the ground. That is, while sleeves 7 are engaged with the ground, they are moving in the direction "B" with respect to the tractor, at the same rate that the tractor is moving in the opposite direction "A". Sleeves 7 thus remain stationary with respect to the ground in the section "Z". The hole making mechanism 4 is propelled by means of external power unit (not seen) which is connected to axle 26, said mechanism is provided with double tooth gear wheels 27 which is in mesh with the endless chains being the driving means thereof.

At point "P.P." the dibbles 23 are inserted into sleeve 7 to be stuck together into the soil. The penetration into the soil is performed with a turn about the axis of each dibble 23 and sleeve 7 as described above. When the penetration into the soil is completed at point "W.P." the dibble 23 is withdrawn from the sleeve 7 which remains in the soil and with the progress of the machine on the ground, the free end of member 51 being attached to the sleeve 7 by means of arrangement 52 as described above, such that there is created a tubular continuation from the open end of sleeve or hose 50 and a hole in the ground. It is quite obvious that a seedling which is deposited into hose 50 slides within the hose and via member 51 into sleeves 7. The movement of the seedling within hose 50 into the ground is aided by means of an air stream which enters the hose 50 at its open end. Sleeves 7 are withdrawn from the soil at the end of section "Y" of the pathway as the pathway ascends.

The invention claimed is:

1. A machine for planting seedlings into the ground, comprising:
   a chassis for movement in a travel direction over the ground;
   endless chain means mounted for movement along a pathway defined on said chassis;
   a plurality of sleeves connected to said chain means for movement along said pathway, each sleeve being insertable into the ground as said chassis moves in the travel direction over the ground and as said endless chain means moves along said pathway;
   air stream assisted seedling supply means mounted to said chassis and respectively engagable with each sleeve for supplying a seedling into each sleeve when each sleeve is inserted into the ground;
   a rotating member mounted to said chassis for rotation along a portion of said pathway; and
   a plurality of pointed dibbles connected to said rotating member for movement along said portion of said pathway and for insertion into each sleeve respectively, as each sleeve passes said portion of said pathway, for making a hole into the ground and for aiding in the insertion of each sleeve into the ground.

2. A machine according to claim 1 wherein said endless chain means comprises a pair of spaced apart endless chains, such comprising a plurality of links, a pin protruding from the links of each chain, a support member pivotally attached between pins of adjacent links on said endless chains, each sleeve being connected to one support member, said support members with sleeves being pivotally mounted with respect to said pins.

3. A machine according to claim 2 including a plate member connected to each support member, a pair of rollers rotatably mounted to each plate member on opposite sides of each plate member with respect to said pathway, pathway means extending on each side of said plate member, each pathway means receiving a roller for guiding said plate members along said pathway means.

4. A machine according to claim 1 wherein said seedling supply means comprises a plurality of flexible seedling delivery hoses supported on said chassis and each having an open end for receiving individual seedlings, a telescoping lower end connected to each flexible hose, and cylinder means connected to each lower end for moving each lower end into and out of registry with a sleeve for supplying a seedling to each sleeve.

5. A machine according to claim 3 wherein said seedling supply means comprises a plurality of flexible seedling delivery hoses supported on said chassis and each having an open end for receiving individual seedlings, a telescoping lower end connected to each flexible hose, and cylinder means connected to each lower end for moving each lower end into and out of registry with a sleeve for supplying a seedling to each sleeve.

6. A machine according to claim 3 including a plurality of telescoping rods connected and circumferentially distributed around said rotating member, each telescoping rod carrying one of said dibbles, a pair of plates connected to said chassis for rotatably supporting said rotating member, and pathway guides in said pair of plates for engagement with said telescoping rod for moving said telescoping rod in order to move said dibbles into and out of engagement with said sleeves as said sleeves move along said portion of said pathway.

* * * * *